C. SONNEBORN.
BOLT POINTING MACHINE.
APPLICATION FILED DEC. 7, 1906.
905,600.
Patented Dec. 1, 1908.
3 SHEETS—SHEET 1.
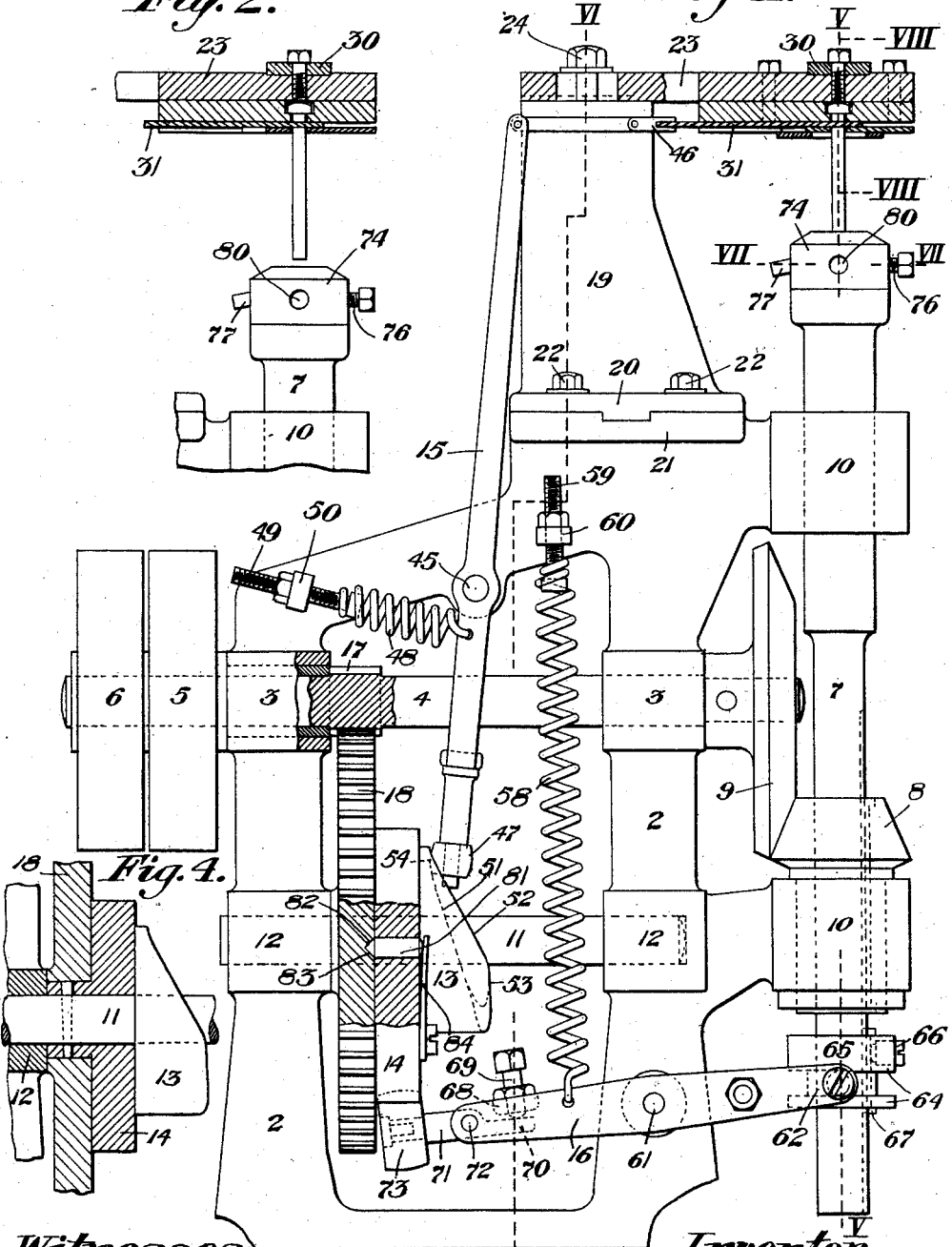

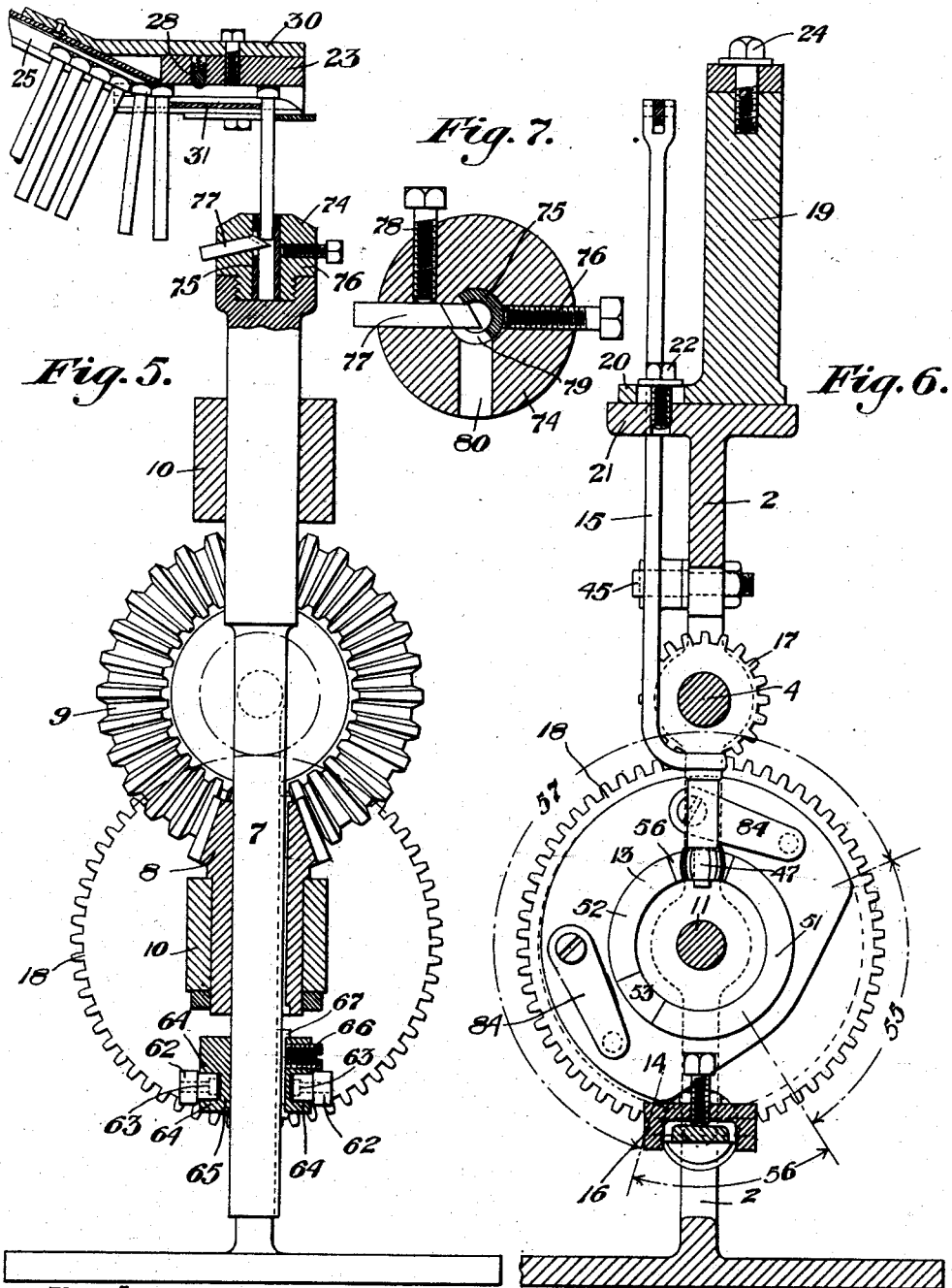

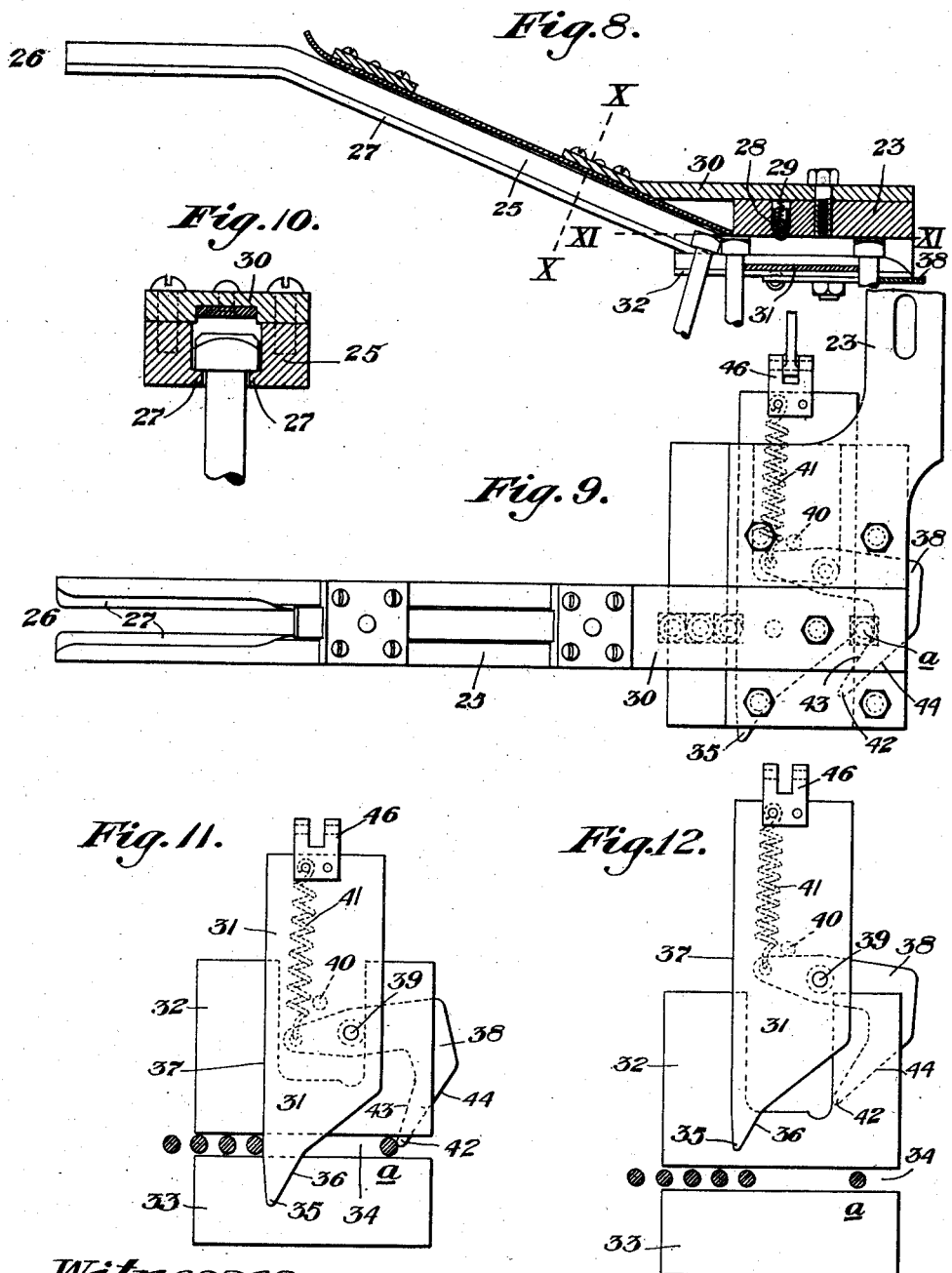

UNITED STATES PATENT OFFICE.

CHARLES SONNEBORN, OF WEST PITTSBURG, PENNSYLVANIA.

BOLT-POINTING MACHINE.

No. 905,600.      Specification of Letters Patent.      Patented Dec. 1, 1908.

Application filed December 7, 1906. Serial No. 346,746.

*To all whom it may concern:*

Be it known that I, CHARLES SONNEBORN, a citizen of the United States, residing at West Pittsburg, in the county of Lawrence and State of Pennsylvania, have invented certain new and useful Improvements in Bolt-Pointing Machines, of which the following is a specification, reference being had therein to the accompanying drawings.

My invention refers to an improved machine for "pointing" bolts or other similar devices and it has for its object to provide mechanism into which the bolts may be fed, and which will automatically select the bolts one at a time, locate them in position for operation, positively holding each bolt, the operative portions of the machine comprising cutting means adapted to approach and operate upon the end of a bolt, which is then discharged, prior to the next succeeding bolt being brought in position.

The invention has in view to provide simple, efficient mechanism for this purpose to continuously operate automatically, capable of adjustment within a wide range of dimensions as to the bolt itself, including means for preventing breakage of parts due to interference, by improved automatic connection with the feed cam; an improved bolt holding thimble; and other features of construction and improvement as shall be more fully hereinafter described.

Referring to the drawings: Figure 1. is a view in side elevation of the machine showing the cutter head in operative position, a portion of the feeding mechanism having been broken away. Fig. 2. is a partial similar detail view showing the cutter head in its lowered position. Fig. 3. is a detail plan view of one end of the spindle-lifting lever. Fig. 4. is a sectional detail view showing the mounting of the lever actuating cams. Fig. 5. is a vertical sectional view on the line V. V. of Fig. 1. Fig. 6. is a similar section on the line VI. VI. of Fig. 1. Fig. 7. is an enlarged cross sectional view on the line VII. VII. of Fig. 1. Fig. 8. is a vertical sectional detail view on the line VIII. VIII. of Fig. 1 showing the run-way for the bolts or blanks and portions of the selecting or positioning mechanism. Fig. 9. is a plan view of the mechanism shown in Fig. 8. Fig. 10. is an enlarged cross section on the line X. X. of Fig. 8. Figs. 11 and 12 are views similar to Fig. 9 the upper construction having been removed on the line XI. XI. of Fig. 8, showing the selecting or positioning mechanism in different positions.

Referring now to the drawings, 2 is the main frame of the machine, which preferably is made in the form of a casting having a suitable base by which it may be rigidly secured upon any convenient supporting foundation, provided with bearings 3, 3, in which is mounted the main driving shaft 4 having the tight-and-loose pulleys 5, 6, by which the apparatus is operated.

7 is a vertical reciprocating spindle having a driven bevel wheel 8 in splined engagement with it, meshing into driving bevel 9 mounted on end of shaft 4, the diameter ratios of said wheels being about one to two, whereby the spindle 7 is driven at say double the speed of driving shaft 4. I thus secure a rapid rotating operation of the cutter, carried in the upper portion of the spindle as hereinafter described, the spindle being vertically mounted in suitable bearings 10, 10.

11 is a countershaft mounted in bearings 12, 12, below shaft 4, for actuation of the feed-mechanism-controlling-cam 13 secured upon or integral with the spindle-lifting cam 14, by each of which cams, through levers 15 and 16 respectively, the bolts or blanks are fed singly to the cutting or pointing position and the cutter itself is raised, as shall be more fully hereinafter set forth. Shaft 11 is driven at a comparatively low rate of speed with relation to shaft 4, through tooth gearing 17, 18, respectively, the driving pinion 17 being preferably cut out of the body portion of the shaft itself and the diameter ratios of said gears being about one to nine. It will thus be seen that the rotating speed of spindle 7 is about eighteen times as fast as the operation of the selecting or positioning mechanism, with which proportions I have secured good results in practice, although I do not desire to be in any way limited to the exact relations of said speeds.

The feeding or selecting mechanism of the machine is mounted upon an upper supplemental post 19 which is provided with one or more flanges 20 set upon a flanged bracket 21 as shown, and secured thereto by bolts 22 passing through slots elongated transversely of the machine as clearly shown. By this construction the position of post 19 may be changed or adjusted by the operator with relation to the work in view or to assist in centralizing the pointing position of the bolt with relation to the cutter.

23 is a supplemental supporting frame carrying the sliding selecting mechanism at its outer end, said frame 23 being likewise adjustably mounted in the upper end of post 19 by means of one or more bolts 24 passing through a slotted opening or openings to the slots for bolts 22, whereby additional adjustment may be secured. By both adjustments it will be seen that the location of the position of the bolt or blank for the cutting operation may be very accurately regulated.

Extending upwardly and backwardly at one side of the working portion of frame 23, which as shown is in the form of a plate, is a supplemental slide-way 25 in which the bolts are inserted by their heads at the charging end 26 which is preferably horizontal as shown for a short distance. The bolt heads rest at each side upon inwardly projecting flanges 27 and the body portions depend downwardly, as clearly shown.

As thus constructed, when the bolts are charged in at one end, they will assume a row and travel down the inclined portion of the slideway by gravity until the front bolt comes into contact with a braking button 28, Fig. 5, whereupon the bolt will be arrested and held until again moved forward by the sliding selecting plate. Said braking button 28 is mounted in the upper portion of frame or plate 23 as shown, having a lower rounded terminal, and is normally pressed down by a cushion spring 29 bearing upwardly against any suitable bearing, as a top plate 30, which is also used to connect plate 23 with the upper portion of the inclined slide-way, as clearly shown, these parts being held together by screws or bolts. Any other suitable form of arresting button or cushioning device may be employed which will stop the travel of the bolt blank and hold it, until taken away by the selecting plate.

31 is the selecting plate referred to, mounted for transverse operation in the lower portion of frame 23, upon suitable sliding bearings in the form of plates 32, 33, secured up underneath the lower side of frame 23 and with an intervening space 34, constituting an extension of the slot-like opening in the inclined delivery slide, by which construction the bolts are designed to travel outwardly in the same direction from the feed slide.

The function of the selecting plate 31 is to take away the front bolt, sliding it forward to the position a Figs. 11 and 12, for the pointing or cutting operation, for which purpose plate 31 is provided with a tapered point 35 and a backwardly tapered edge 36 extending away from said point on that side of plate 31 in which the supplemental travel of the blank towards the pointing position a occurs. The other edge 37 of plate 31 is made substantially straight as shown with the exception of the forward part which is preferably slightly tapered, whereby the next succeeding bolts are retained against forward travel until the next operation.

38 is a supplemental discharging ejector pivoted to plate 31 at 39 as shown, and normally held backwardly against a limiting stop 40 extending down underneath the plate 31, by means of the tension spring 41, plate 32 being cut out as indicated in dotted lines for clearance for these parts. Discharging ejector 38 is pointed as at 42 having an inner inclined face or edge 43 and an outer inclined edge 44 tapering away from said point 42, said tapering edges 43 and 44 being provided for a double purpose. The function of edge 43 is to slide backwardly along the front edge of the bolt or blank, after it has been engaged at its lower extremity by the holding thimble of the cutter, said operation as to ejector 38 being illustrated in Fig. 11. The other function of said ejector is to finally discharge the pointed bolt by its tapered edge 44, after the cutting operation, when the thimble has been lowered, at the next forward travel of plate 31, as indicated in Fig. 11.

The feeding motion of plate 31 and its attached ejector 38 is secured through lever 15, pivoted at 45 and attached at its upper end by connecting link 46, with clevis 45 of the plate. Motion is imparted to withdraw the plate 31 by means of cam 13, as clearly shown, acting against roller 47 at the lower end of lever 15, such end of said lever and its roller being constantly held back against the cam by means of tension spring 48 as shown, mounted by means of threaded bolt 49 in bearing 50 so as to adjust the tension.

Cam 13 is provided with the long inclined face 51 and short inclined face 52 by which the roller is raised from the lowest to the highest point of the cam to effect slow withdrawal of the plate 31, being drawn back against the falling face 52 of the cam by spring 48 to effect the comparatively quick thrusting in of said plate, by reason of the fact that the inclined face 51 is of about double the length of face 52. At the highest point of the cam a short flat face 53 occurs and at the lowest point a corresponding short flat face 54, corresponding to short periods of rest of lever 15 and corresponding short stationary periods as to plate 31.

The cutter spindle 7 is raised by means of cam 14, said cam having an inoperative or lowering portion extending from the points indicated by line 55 and a preliminary raising face indicated by line 56, the operative portion of the cam for the actual cutting being indicated by line 57. The latter portion rises gradually and steadily and effects the gradual raising of the spindles 7 after it has been raised by the lifting face 56 to the point when the cutter at its top begins to cut. This operation will be readily understood from the face view of the cam, Fig. 5, its gradual operative face 57 slowly lifting the cutter in the spindle until the highest point is reached, after which the spindle and cutter quickly fall, due to the counteracting effect of tension spring 58. Said spring is connected with the lever 16 as shown and is provided with an adjusting screw 59 mounted in stud 60, by which the same adjustment already described as to spring 48 will be secured.

Lever 16 is preferably made in two halves or sides, pivoted upon bolt 61 extending transversely through the main frame, or upon stud bolts at each side as preferred, and engages by its forward terminals 62 and pins 63 between the flanges 64 of collar 65, adjustably set upon the lower edge of spindle 7. The collar may be conveniently provided with a set-screw 66 bearing against a key 67 mounted in the slot or spline opening of the spindle, or the set-screw or other adjusting device may be of any other form desired. The adjustment of collar 65 provides for the vertical adjustment of the cutter spindle to locate the cutter at proper position for operation on the ends of bolts of varying lengths. At its other end lever 16 is provided with a cross bar 68 on which is mounted an adjusting set screw 69 adapted to bear down upon the inner end 70 of a stud 71, pivoted between the arms 16 at 72 and carrying at its outer end a cam roller 73. By this construction it will be seen that the effective lift of lever 16 as actuated by cam 14 may be very accurately regulated to compensate for wear or to provide for adjustment as desired.

At its upper end spindle 7 is provided with a cutter head 74 screwed upon or otherwise secured to the spindle, provided with a vertical opening arranged to aline or register with the lower end of the bolt. Within this opening is set a thimble 75 secured by set screw 76, the function of which is to embrace and hold the lower end of the bolt with which it makes a neat fit. The inner upper end of thimble 75 is rounded off as shown to facilitate entrance of the bolt, and its inner diameter varies according to the diameter of the bolts, so that the thimble may be changed to suit the size of the bolt being operated on.

77 is the cutter, of any suitable form, projecting inwardly through cutter head 74 and the thimble and positively held by set screw 78, the cutting face thereof being so arranged as to cut a blunt taper on the bolt end.

For the purpose of providing clearance for the cutter and also for escape of the cuttings, thimble 75 is cut out as at 79, the head 74 being also provided with a lateral opening 80 for the same purpose.

In order to prevent strain or breakage of the parts due to jamming or disarrangement of the bolts, cams 13 and 14, which are rigidly connected together in any suitable way, are interlocked with gear 18 by means of connecting bolts or studs 81 extending through cam 14 and provided with blunt conical points 82 engaging corresponding sockets 83 in gear 18. The bolts are normally held in interlocking position by spring plates 84 bearing against their outer ends, the spring plates being of sufficient strength to normally hold the bolts thrust into sockets 83, so that gear 18 will transmit motion to the cams.

In case of any undue resistance to the cams from lever 15 or 16 due to jamming, etc. the bolts 81 will be forced out of engagement with gear 18, the cams and shaft 11 then remaining stationary, due to the hub of cam 14 being secured on shaft 11, as shown. The gear 18 continuing to revolve, will again engage the tapered ends of the bolts by sockets 83 when they next come into register and will again make interlocking engagement to actuate the cams, when the resistance has been adjusted.

The operation of my improved machine will be readily understood from the foregoing description. The bolts are introduced into the end 26 of the feed chute by hand or any other means, falling down the incline in close continuous proximity to each other, each end-most forward bolt being temporarily arrested by abutment 28 as described. The bolts are then independently moved forward by the point 35 of the selecting blade to the pointing position $a$. The revolving cutter is then raised, embracing the lower end of the bolt by thimble 75, positively holding it in vertical position, the bolt itself being held against rotation by reason of the engagement of its head between the sides of the chute. The rotation of spindle 7 and the gradual rising of the cutter remove the desired portion from the end of the bolt, "pointing" it, whereupon the spindle 7 is dropped and on the next forward travel of plate 31 a finished bolt is discharged by inclined face 44 outwardly through the opposite end of the slotted way into any suitable receiving receptacle. The operation is continuous, automatic and rapid, giving a uniform finish to the bolts at comparatively low cost.

It will be understood that the invention may be variously modified or changed by the skilled mechanic in different details of construction or in other features without departing from the scope of the following claims.

What I claim is:

1. In a machine of the class described, means for feeding and positioning bolts singly with relation to a cutter, consisting of an inclined slide-way, a spring-actuated button for engaging and arresting the end-most bolt, a reciprocable selecting plate for engaging the end-most bolt edgewise and positioning it, said inclined slide-way having horizontal parallel extensions for supporting and holding the bolt for operation with relation to the cutter, and means connected with and operable by the sliding-plate for discharging the finished bolt, substantially as set forth.

2. Feeding and positioning mechanism comprising an inclined slotted chute, an arresting device, and a reciprocable pointed plate adapted to move laterally across the chute and separate the end-most bolt and move it to cutting position, means for holding the bolt against rotation, and a supplemental spring-controlled ejector for ejecting the bolt, substantially as set forth.

3. Feeding and positioning mechanism comprising an inclined slotted chute having a horizontal terminal portion, a bolt-arresting device, means adapted to engage the head of the bolt to hold it against rotation, a reciprocable pointed plate arranged laterally of the horizontal chute terminal adapted to separate the end-most bolt and move it to the cutting position, a supplemental spring-controlled ejector pivotally mounted on said plate having a tapered inclined terminal adapted to swing outwardly in front of the bolt on back travel and to engage behind and eject it on forward travel, and means for actuating said mechanism, substantially as set forth.

4. In a bolt pointing machine, the combination with a selecting plate and its actuating lever, of a shaft, a gear wheel mounted thereon provided with a recess, and a cam loosely mounted on said shaft and engaging said lever and provided with a spring-pressed locking pin having a point adapted to engage the recess in the driving gear wheel, substantially as set forth.

5. In a bolt pointing machine, the combination with the selecting plate and its actuating lever, and the vertically reciprocable rotatable cutter spindle, of a driving shaft geared with said spindle, a counter shaft geared with said shaft, a lifting lever for said reciprocable shaft, a driven gear wheel mounted on said counter shaft provided with a recess, and a cam loosely mounted on said counter shaft and engaging the actuating lever for the selecting plate and the lifting lever for the reciprocable shaft respectively, said cam having a spring-pressed locking pin adapted to engage the recess in the driven gear wheel, substantially as set forth.

6. In a bolt pointing machine, the combination with a vertically reciprocatable rotatable cutter spindle provided with a cutter, an inclined feed chute, a movable feed plate arranged across said chute, and means for holding a bolt in a vertically depending position in operative relation to said cutter; of means for rotating the spindle, means for reciprocating the spindle and for actuating the feed plate, a shaft, and cam mechanism normally in driving engagement with but automatically disengageable from said shaft for actuating said spindle-reciprocating and plate-actuating means, substantially as set forth.

7. In a bolt cutter, the combination with an inclined feed chute, and means for temporarily arresting the end-most bolt, of a pointed selecting plate movable transversely of the feed chute having a pivotally attached ejector plate arranged to move with the plate and to engage and discharge the bolt, substantially as set forth.

8. In a bolt cutter, the combination with an inclined feed chute, means for temporarily arresting the end-most bolt, and means for holding the bolt by its head against rotation, of a pointed selecting plate movable transversely of the feed chute having a pivotally attached ejector plate arranged to move with the plate and to engage and discharge the bolt, substantially as set forth.

9. In a bolt cutter, the combination with an inclined feed chute and means for temporarily arresting the endmost bolt, of a pointed selecting plate movable transversely of the feed chute having a pivotally attached ejector plate arranged to move with the plate and to engage and discharge the bolt, a limiting abutment, and a spring adapted to normally hold the ejector plate against said abutment but to permit its operative end to swing out past the bolt on backward travel, substantially as set forth.

In testimony whereof I affix my signature in presence of two witnesses.

CHARLES SONNEBORN.

Witnesses:
JAMES W. RHODES,
CHARLES A. MCCREADY.